(12) United States Patent
Sakakibara et al.

(10) Patent No.: US 9,598,105 B2
(45) Date of Patent: Mar. 21, 2017

(54) VEHICLE CONTROL APPARATUS AND VEHICLE CONTROL METHOD

(71) Applicant: AISIN SEIKI KABUSHIKI KAISHA, Kariya-shi, Aichi-ken (JP)

(72) Inventors: Haruki Sakakibara, Nagoya (JP); Kinji Yamamoto, Anjo (JP); Makoto Hirata, Ichinomiya (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 96 days.

(21) Appl. No.: 14/095,510

(22) Filed: Dec. 3, 2013

(65) Prior Publication Data

US 2014/0160275 A1 Jun. 12, 2014

(30) Foreign Application Priority Data

Dec. 4, 2012 (JP) ................................ 2012-265799

(51) Int. Cl.
*B62D 15/02* (2006.01)
*B60R 1/00* (2006.01)

(52) U.S. Cl.
CPC .............. *B62D 15/027* (2013.01); *B60R 1/00* (2013.01); *B62D 15/029* (2013.01); *B60R 2300/105* (2013.01); *B60R 2300/303* (2013.01)

(58) Field of Classification Search
CPC ........ B62D 15/027; B62D 15/029; B60R 1/00
See application file for complete search history.

(56) References Cited

U.S. PATENT DOCUMENTS

| 8,675,992 | B2 * | 3/2014 | Dietz ................... G02B 21/365 |
| | | | 348/144 |
| 2002/0047901 | A1 * | 4/2002 | Nobori et al. ................ 348/149 |
| 2003/0030546 | A1 * | 2/2003 | Tseng ......................... 340/425.5 |
| 2007/0085901 | A1 * | 4/2007 | Yang ..................... H04N 7/181 |
| | | | 348/47 |
| 2009/0009604 | A1 * | 1/2009 | Kanaoka et al. ............. 348/148 |
| 2011/0066329 | A1 * | 3/2011 | Wakayama et al. ............ 701/42 |
| 2011/0135184 | A1 * | 6/2011 | Takahashi ................. G06T 5/50 |
| | | | 382/132 |
| 2012/0026333 | A1 * | 2/2012 | Okuyama ..................... 348/148 |
| 2012/0249789 | A1 * | 10/2012 | Satoh ........................... 348/143 |

(Continued)

FOREIGN PATENT DOCUMENTS

JP 2007-141098 A 6/2007
JP 2007141098 A * 6/2007 ............... H04N 7/18

*Primary Examiner* — Jingge Wu
(74) *Attorney, Agent, or Firm* — Sughrue Mion, PLLC

(57) ABSTRACT

A vehicle control apparatus includes: an acquiring unit configured to acquire a plurality of items of image information of images photographed by a plurality of image pickup units provided on a vehicle as an outside environment of the vehicle and whose image picked-up areas are partly overlapped with each other; a correcting unit configured to compare a position of a first overlapped area included in one of two items of image information of images whose image picked-up areas are overlapped with each other with a position of a second overlapped area of the other image information, and if the position of the first overlapped area is closer to a center of a display area of the image information, correct the other image information so as to cause the luminance of the second overlapped area to match the luminance of the first overlapped area.

13 Claims, 11 Drawing Sheets

(56) References Cited

U.S. PATENT DOCUMENTS

| | | | | |
|---|---|---|---|---|
| 2012/0265416 A1* | 10/2012 | Lu | ............................ | B60R 1/00 |
| | | | | 701/70 |
| 2012/0300077 A1* | 11/2012 | Ikeda | ........................ | B60R 1/00 |
| | | | | 348/148 |
| 2013/0307985 A1* | 11/2013 | Numata et al. | ................ | 348/148 |
| 2014/0098229 A1* | 4/2014 | Lu | .......................... | H04N 7/181 |
| | | | | 348/148 |

* cited by examiner (1) FRONT CAMERA (2) SIDE CAMERA

VEHICLE CONTROL APPARATUS AND VEHICLE CONTROL METHOD

CROSS REFERENCE TO RELATED APPLICATIONS

This application is based on and claims priority under 35 U.S.C. §119 to Japanese Patent Application 2012-265799, filed on Dec. 4, 2012, respectively, the entire content of which is incorporated herein by reference.

TECHNICAL FIELD

This disclosure relates to a vehicle control apparatus and a vehicle control method.

BACKGROUND DISCUSSION

In the related art, a technology that provides a driver with image data picked up by a plurality of cameras installed on a vehicle as a peripheral environment of the vehicle is proposed as a technology for assisting parking of the vehicle.

Among the plurality of picked-up image data, luminance mismatch is developed according not only to mounted positions, orientations, or characteristics of the cameras, but also to characteristics of lenses used in these cameras. Therefore, a technology for performing correction of luminance on the image data when providing the driver with the image data is proposed (JP 2007-141098A (Reference 1)).

However, in the related art, there is a case where the characteristics of the lenses of the cameras are unknown, and in such a case, suitable correction of the image data to be presented to the driver may become difficult.

SUMMARY

A vehicle control apparatus of an embodiment includes an acquiring unit and a correcting unit as an example. The acquiring unit is configured to acquire information of a plurality of images photographed by a plurality of image pickup units provided on a vehicle as an outside environment of the vehicle and whose image picked-up areas are partly overlapped. The correcting unit compares a position of a first overlapped area included in one of two items of image information of images whose image picked-up areas are overlapped with each other with a position of a second overlapped area of the other image information, and if the position of the first overlapped area is closer to a center of a display area of the image information, corrects the other image information so as to cause the luminance of the second overlapped area to match the luminance of the first overlapped area. Therefore, a suitable correction is advantageously achieved for image information irrespective of the lens characteristics of the plurality of image pickup units.

As an example of the vehicle control apparatus described above further includes a generating unit configured to generate an overhead video looking down at an outside environment of the vehicle from above on the basis of the plurality of items of image information corrected by the correcting unit. Therefore, since an overhead video is generated on the basis of the plurality of items of image information of the images corrected in the luminance, an overhead video having a good visibility is advantageously provided for the driver.

As an example of the vehicle control apparatus described above, the overhead video generated by the generating unit is segmented for each of the plurality of items of image information. Therefore, the overhead image in which the difference of the image pickup units is recognizable is advantageously provided for the driver.

As an example of the vehicle control apparatus described above, the correcting unit further corrects the luminance of the second overlapped area after the correction to have a value between the luminance of the first overlapped area and the luminance of the second overlapped area before the correction. Therefore, a feeling of strangeness due to the difference in the luminance among the plurality of items of image information is advantageously suppressed.

As an example of the vehicle control apparatus described above, in a case where a first image picked-up area of the image information of the picked up image of the outside environment of a front from a front end portion of the vehicle or of the image information of the picked up image of an outside environment of a rear portion from a rear end portion of the vehicle is partly overlapped with a second image picked up area of the image information of the image picked up sideward from the side surface portion of the vehicle, the correcting unit corrects the image information of the image picked up from the side surface portion so as to cause the luminance of the overlapped area of the second image picked-up area to match the luminance of the overlapped area of the first image picked-up area. Therefore, a suitable luminance correction of the image information in accordance with the vehicle body may be advantageously achieved in accordance with the vehicle body.

As an example of the vehicle control apparatus described above, the plurality of image pickup units provided on the vehicle have the same lens characteristics. Therefore, a suitable luminance correction is advantageously achieved irrespective of the lens characteristics of the plurality of image pickup units.

A vehicle control method of the embodiment includes an acquiring step and a correcting step. The acquiring step acquires information of a plurality of images photographed by a plurality of image pickup units provided on a vehicle as an outside environment of the vehicle and whose image picked-up areas are partly overlapped. The correcting step compares a position of a first overlapped area included in one of two items of image information of images whose image picked-up areas are overlapped with each other with a position of a second overlapped area of the other image information, and if the position of the first overlapped area is closer to a center of a display area of the image information, corrects the other image information so as to cause the luminance of the second overlapped area to match the luminance of the first overlapped area. Therefore, as an example, a suitable correction is advantageously achieved for image information irrespective of the lens characteristics of the plurality of image pickup units.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

In a first embodiment, a vehicle 1 may be an automatic vehicle (an automotive vehicle with an internal combustion engine) having an internal combustion engine (an engine, not illustrated) as a drive source, for example, or an automatic vehicle (an electric vehicle, a fuel cell automotive vehicle, and the like) having an electric motor drive (a motor, not illustrated) as a drive source, or an automatic vehicle having both as drive sources (a hybrid automatic vehicle). The vehicle 1 allows various speed changing devices to be mounted thereon, and various devices (systems, parts, and the like) required for driving the internal combustion engine and the electric motor drives to be mounted thereon. The system, the number, the layout, and the like of devices relating to driving of the wheels 3 of the vehicle 1 may be set variously.

Figure 1:
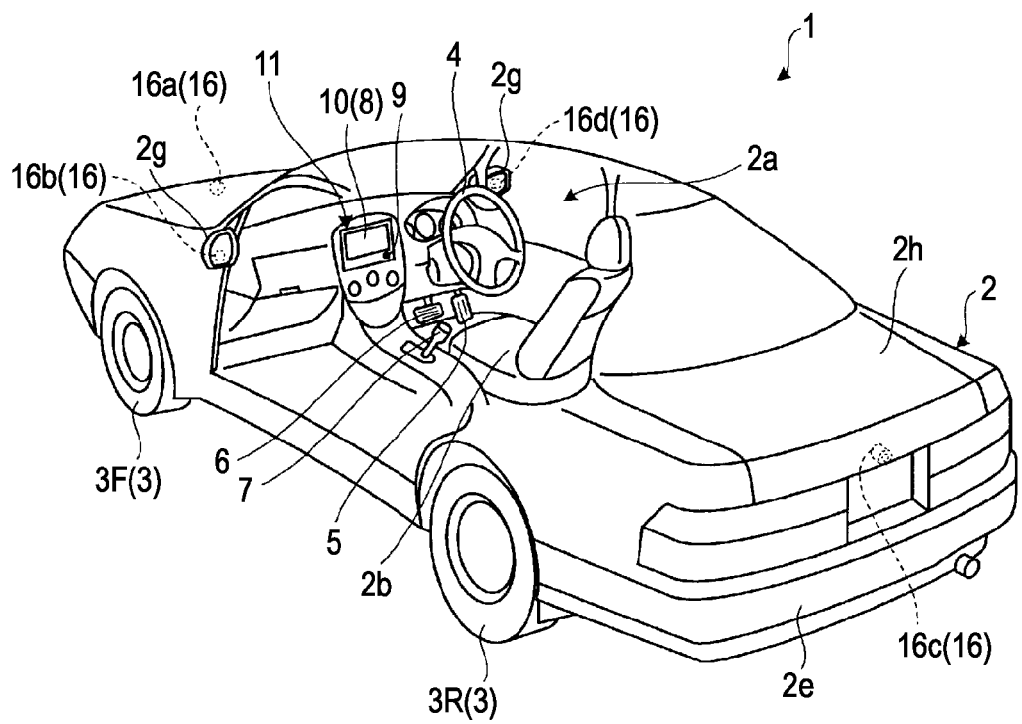
FIG. 1 is a perspective view, partly broken, of an example of a vehicle of a first embodiment.

As illustrated in FIG. 1, a vehicle body 2 constitutes a cabin 2a in which a passenger (not illustrated) gets in. A steering unit 4, an acceleration operating unit 5, a brake operating unit 6, and a speed-change operating unit 7 are provided in the cabin 2a in a state of facing a seat 2b of the driver as a passenger. As an example in the first embodiment, the steering unit 4 is a steering wheel projecting from a dash board (instrument panel), the acceleration operating unit 5 is an accelerator pedal positioned under a foot of the driver, the brake operating unit 6 is a brake pedal positioned under the foot of the driver, and the speed-change operating unit 7 is a shift lever projecting from a center console. However, these members are not limited thereto.

In the cabin 2a, a display device 8 (display output unit) and a sound output device 9 (sound output unit) are provided. The display device 8 is, for example, an LED (liquid crystal display) or an OELD (organic electroluminescent display). The sound output device 9 is a speaker, for example. As an example of the first embodiment, the display device 8 is covered with a transparent operation input unit 10 (for example, a touch panel or the like). The passenger and the like can view a video (image) displayed on a display screen of the display device 8 via the operation input unit 10. The passenger or the like is capable of executing an operation input (an instruction input) by operating the operation input unit 10 by touching, pushing or moving his or her fingers or the like on a position corresponding to the video (image) displayed on the display screen of the display device 8. As an example of the first embodiment, the display device 8, the sound output device 9, the operation input unit 10, and the like are provided on a monitor device 11 positioned at a center portion of the dash board in the vehicle width direction (left and right direction). The monitor device 11 may have an operation input unit (not illustrated) such as switches, dials, joysticks, push buttons and the like. In addition, a sound output device (not illustrated) may be provided at other positions in the cabin 2a different from the monitor device 11, or a sound may be output from both of the sound output device 9 on the monitor device 11 and another sound output device. As an example of the first embodiment, the monitor device 11 is used concurrently as a navigation system and an audio system. However, a monitor device for a parking assist unit may be provided separately from these systems. A configuration in which an alarm sound or the like is output from a sound output unit such as a buzzer 24 (see FIG. 3) in addition to the sound output device 9 is also applicable.

Figure 2:
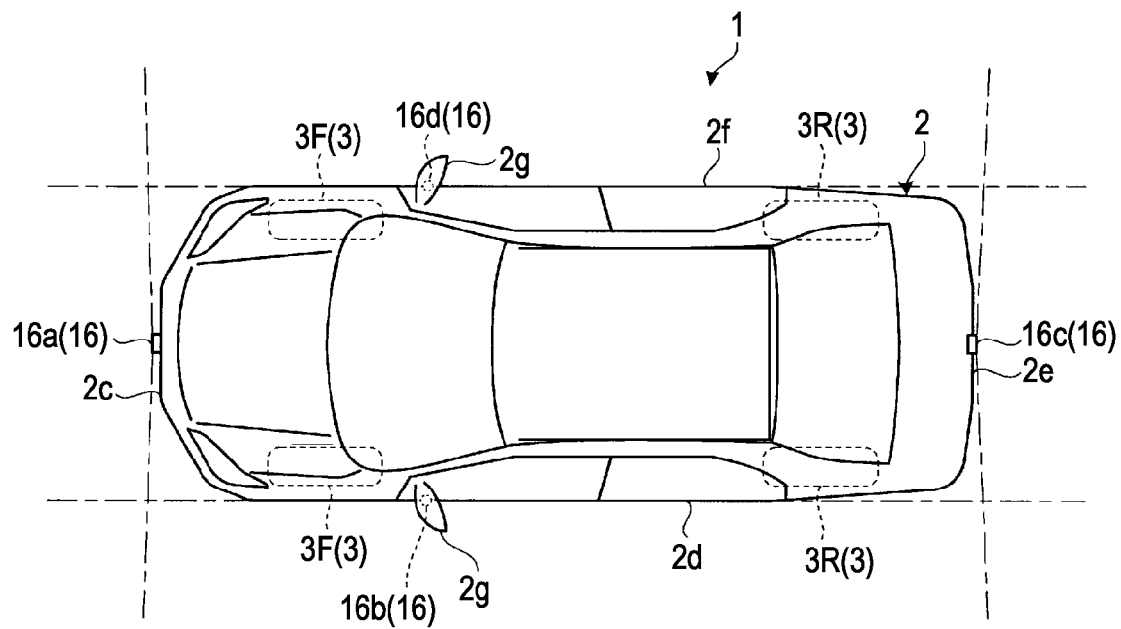
FIG. 2 is a plan view illustrating an example of the vehicle of the first embodiment.
Figure 3:
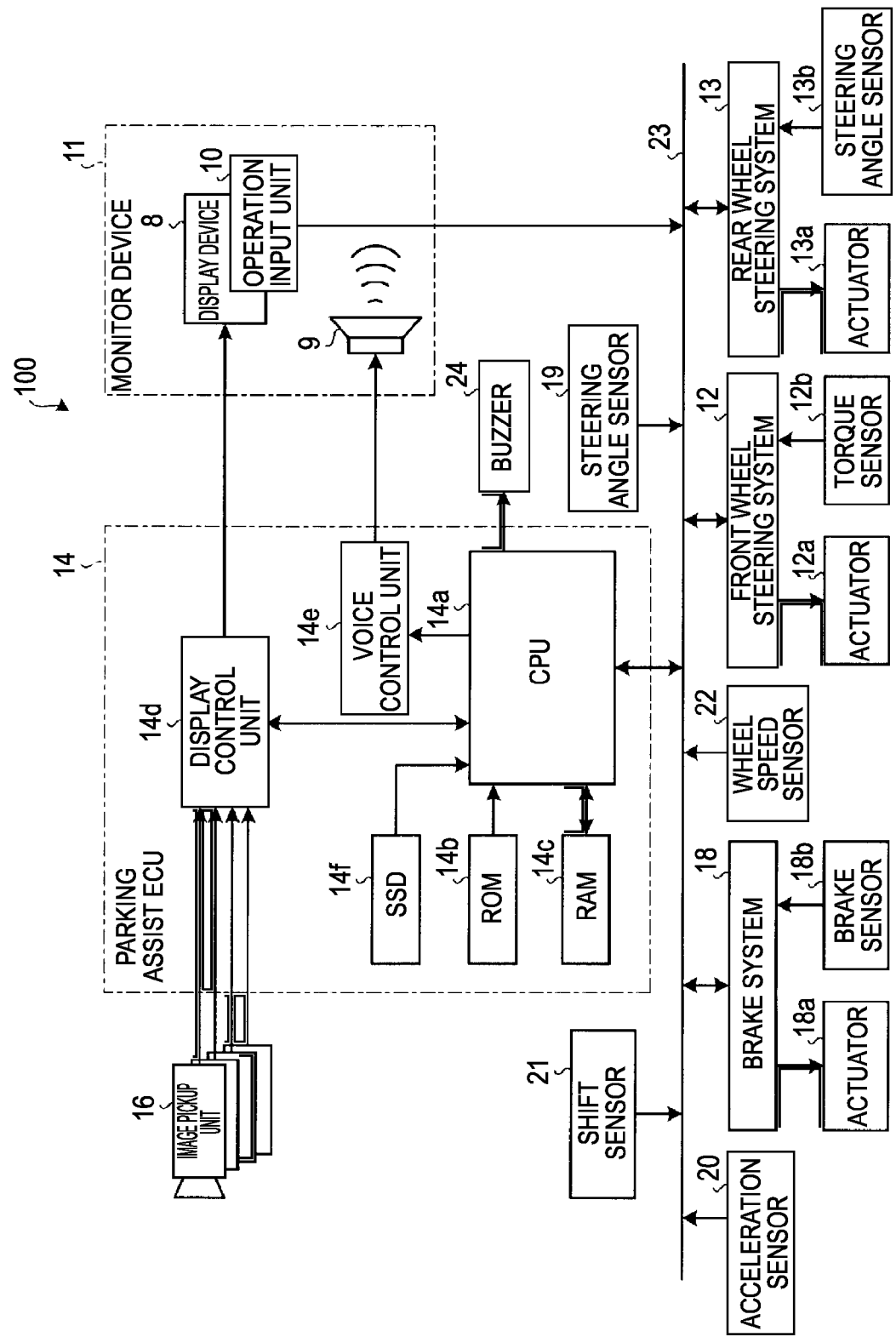
FIG. 3 is a block diagram illustrating an example of a configuration of the vehicle of the first embodiment.

As illustrated in FIGS. 1 and 2, as an example of the first embodiment, the vehicle 1 is a four-wheel vehicle (a four-wheel automotive vehicle), and has left and right two front wheels 3F and left and right two rear wheels 3R. In addition, in the first embodiment, these four wheels 3 are configured to allow steering (to be steerable). Specifically, as illustrated in FIG. 3, the vehicle 1 includes a front wheel steering system 12 configured to steer the front wheels 3F and a rear wheel steering system 13 configured to steer the rear wheels 3R. The front wheel steering system 12 and the rear wheel steering system 13 are electrically controlled by a parking assist ECU 14 (electronic control unit) or the like, and operate actuators 12a and 13a respectively. The front wheel steering system 12 and the rear wheel steering system 13 are, for example, an electric power steering system or a SBW (steer by wire) system. The front wheel steering system 12 and the rear wheel steering system 13 are configured to add a torque (an assist torque) to the steering unit 4 by the actuators 12a and 13a to make up for a steering force or steer (automatically steer) the corresponding wheels 3 (the front wheels 3F or the rear wheels 3R). The actuators 12a and 13a may steer a single wheel 3 or a plurality of wheels 3. As an example of the first embodiment, the two front wheels 3F are turned substantially parallel to each other in the same phase (the same phase, the same turning direction, and the same rotating direction), and the two rear wheels 3R are turned in substantially the same phase and substantially parallel to each other. The drive wheels may be set in various manners.

As an example of the first embodiment, as illustrated in FIG. 2, the vehicle 1 (the vehicle body 2) is provided with a plurality of (four in the first embodiment for example) image pickup units 16 (16a to 16d). The image pickup unit 16 is a digital camera including an image pickup element such as a CCD (charge coupled device) or a CIS (CMOS image sensor) or the like integrated therein. The image pickup units 16 output image data (movie data, frame data) at a predetermined frame rate. The image pickup units 16 each include a wide angle lens so as to be capable of photographing a range (a view angle) of 150° to 220°. Optical axes of the image pickup units 16 are set so as to be directed downward (obliquely downward). Therefore, the image pickup units 16 photograph an external environment in the periphery of the vehicle body 2 including a road surface on which the vehicle 1 can travel.

As an example of the first embodiment, the image pickup unit 16a is positioned at an end 2c (an end in plan view) on the front side (the front side in the fore-and-aft direction of the vehicle) of the vehicle body 2, and is provided on a front bumper or the like. The image pickup unit 16b is positioned at an end 2d on the left side (the left side in the vehicle width direction) of the vehicle body 2, and is provided on a door mirror 2g (projecting portion) on the left side. The image pickup unit 16c is positioned at an end 2e on the rear side (the rear side in the fore-and-aft direction of the vehicle) of the vehicle body 2 and is provided on a lower wall portion of a door 2h of the rear trunk. The image pickup unit 16d is positioned at an end 2f of the right side (right side in the vehicle width direction) of the vehicle body 2, and is provided on the right side door mirror 2g (projecting portion). The parking assist ECU 14 is capable of executing arithmetic processing or image processing on the basis of the image data obtained by the plurality of image pickup units 16, and generating an image having a wider view angle or generating a virtual overhead image (plan image) of the vehicle 1 (the vehicle body 2) viewed from above.

In the first embodiment, for example, as illustrated in FIG. 3, the brake system 18, the steering angle sensor 19 (the angle sensor), the acceleration sensor 20, a shift sensor 21, and a wheel speed sensor 22 as well as the parking assist ECU 14, the monitor device 11, the front wheel steering system 12, and the rear wheel steering system 13 are electrically connected via an in-vehicle network 23 (electric communication line) in the parking assist system 100. The in-vehicle network 23 is generally configured as CAN (controller area network) for example. The parking assist ECU 14 is capable of controlling the front wheel steering system 12, the rear wheel steering system 13, the brake system 18, and the like by transmitting control signals via the in-vehicle network 23. The parking assist ECU 14 is capable of receiving detected results from the torque sensor 12b, the steering angle sensor 13b (for the rear wheels 3R), a brake sensor 18b, the steering angle sensor 19 (for the front wheels 3F), the acceleration sensor 20, the shift sensor 21, the wheel speed sensor 22, and the like, as well as instruction signals (a control signal, an operation signal, an input signal, and data) of the operation input unit 10 or the like via the in-vehicle network 23.

The parking assist ECU 14 includes a CPU 14a (central processing unit), a ROM 14b (read only memory), a RAM 14c (random access memory), a display control unit 14d, a sound control unit 14e, and a SSD 14f (solid state drive, flash memory), for example. The CPU 14a executes, for example, various arithmetic processing such as image processing relating to the images displayed on the display device 8, an arithmetic operation of the travel route of the vehicle 1, and determination of presence or absence of interference with other objects. The CPU 14a reads out a program stored (installed) in a nonvolatile memory device such as the ROM 14b, and executes the arithmetic processing according to the program. The RAM 14c temporarily memorizes various data used in arithmetic operation of the CPU 14a. The display control unit 14d mainly executes image processing using image data obtained by the image pickup units 16, and image processing (making a composite image for example) of image data to be displayed on the display device 8 among the arithmetic processing performed by the parking assist ECU 14. The sound control unit 14e mainly executes processing of sound data output from the sound output device 9 among the arithmetic processing performed by the parking assist ECU 14. The SSD 14f is a rewritable non-volatile memory unit, and is configured to memorize data even when a power source of the parking assist ECU 14 is turned off. The CPU 14a, the ROM 14b, the RAM 14c, and the like may be integrated in the same package. The parking assist ECU 14 may have a configuration in which other logical arithmetic operation processor or a logical circuit such as DSP (digital signal processor) or the like is provided instead of the CPU 14a. An HDD (a hard disk drive) may be provided instead of the SSD 14f, and the SSD 14f and the HDD may be provided separately from the parking assist ECU 14.

Examples of the brake system 18 include an ABS (an anti-lock brake system) which suppresses locking of the brake, an antiskid device (ESC: electronic stability control) which suppresses skid of the vehicle 1 at the time of cornering, an electric brake system which enhances the braking force (executes a brake assist), and a BBW (brake by wire). The brake system 18 provides a braking force to the wheels 3 (the vehicle 1) via the actuator 18a.

The steering angle sensor 19 is a sensor configured to detect a steering amount (turned angle) of the steering unit 4 (a steering wheel as an example of the first embodiment), and is configured with a Hall element or the like as an example. The steering angle sensor 13b is a sensor configured to detect a steering amount (turned angle) of the rear wheels 3R and is configured with a Hall element or the like as an example. The parking assist ECU 14 acquires the steering amount of the steering unit 4 done by the driver, the steering amount of the respective wheels 3 at the time of automatic steering, and the like from the steering angle sensors 19 and 13b and executes various types of control. The torque sensor 12b detects the torque with which the drive provides the steering unit 4.

The wheel speed sensor 22 is a sensor configured to detect the rotating amount and the number of rotation per unit time of the wheels 3, and is configured with a Hall element or the like as an example. The parking assist ECU 14 performs the arithmetic operation of the amount of travel of the vehicle 1 on the basis of data acquired from the wheel speed sensor 22, and executes various types of control. The wheel speed sensor 22 may be provided on the brake system 18 in some cases. The brake system 18 is configured to detect locking of the brake, idling of the wheels 3, sign of skid, or the like from the difference of rotation of the left and right wheels 3 or the like, and execute various types of control. When the wheel speed sensor 22 is provided on the brake system 18, the parking assist ECU 14 acquires data via the brake system 18. The brake sensor 18b is a sensor configured to detect the amount of operation of the brake pedal, and the parking assist ECU 14 acquires information via the brake system 18. When the brake operating unit 6 is operated during the automatic steering, for example, the parking assist ECU 14 discontinues or stops the automatic steering by determining that the situation is not suitable for the automatic steering.

The shift sensor 21 is a sensor configured to detect the position of movable parts (a lever, an arm, a button, and the like) of the speed-change operating unit 7, and is configured by using a displacement sensor or the like. For example, the parking assist ECU 14 starts assist control when the movable parts are set to reverse positions, and stops the assist control when the movable parts are changed from the reverse positions to advance positions.

The above-described configurations, arrangement, and states of electrical connection of the various sensors and the actuators are examples only, and various modifications are possible.

Figure 4:
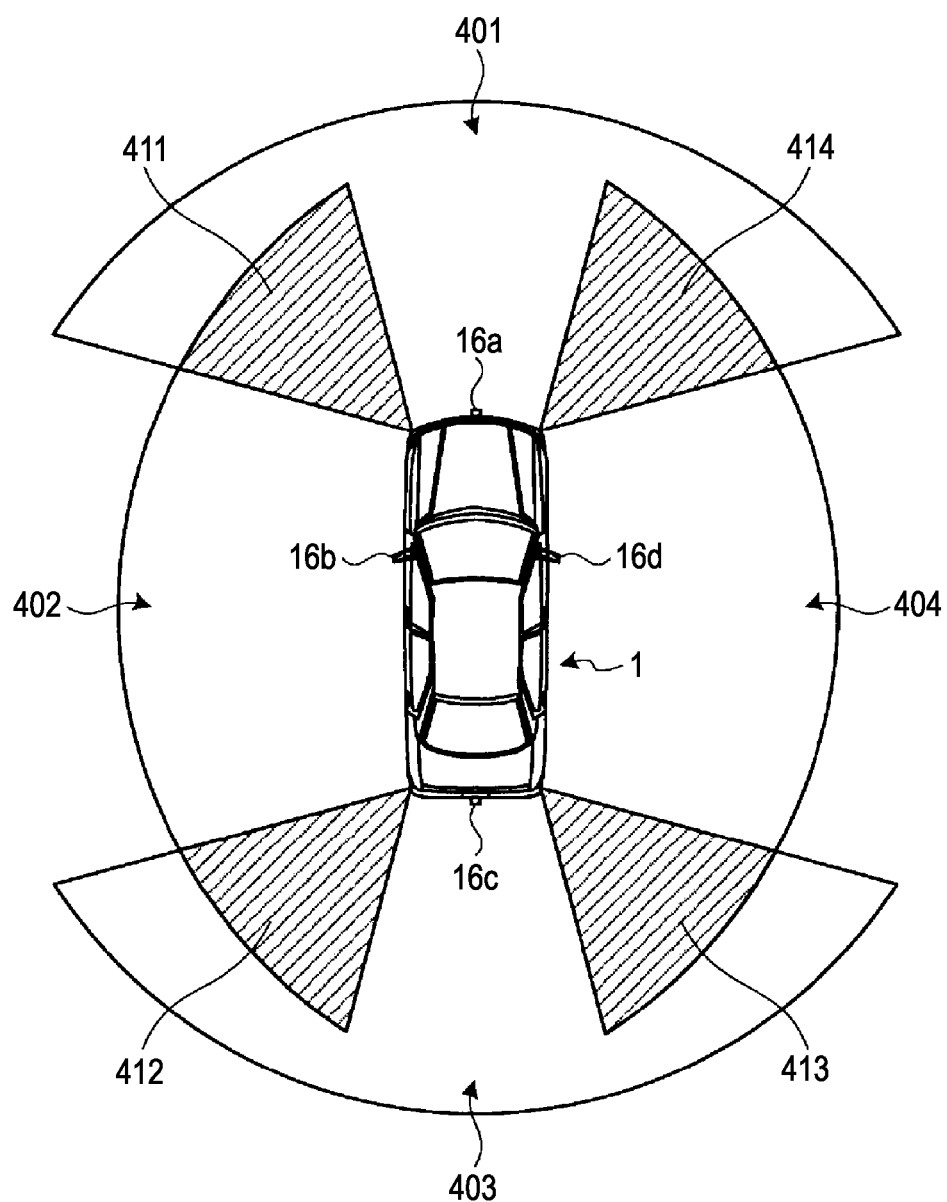
FIG. 4 is a drawing illustrating an image picked-up areas picked up by image pickup units provided on the vehicle of the first embodiment.

FIG. 4 is a drawing illustrating an image picked-up area picked up by the image pickup units 16 provided on the vehicle 1. As illustrated in FIG. 4, it is understood that the image picked-up areas 401 to 404 taken by the image pickup units 16a to 16d are partly overlapped.

Specifically, an overlapped area 411 exists between the image picked-up area 401 on the front and the image picked-up area 402 on the left. An overlapped area 412 exists between the image picked-up area 402 on the left and the image picked-up area 403 on the rear. An overlapped area 413 exists between the image picked-up area 403 on the rear and the image picked-up area 404 on the right. An overlapped area 414 exists between the image picked-up area 404 on the right and the image picked-up area 401 on the front.

In the first embodiment, all of the lenses used for the image pickup units 16a to 16d have the same lens characteristics. Therefore, the angles of view of the image pickup units 16a to 16d, the surface areas of the image picked-up areas 401 to 404, and the like are the same, and the light amounts changing from the centers of the lenses toward the peripheries are the same.

There is a case where the luminance of the overlapped area 411 of the image data picked up by the image pickup unit 16a and the luminance of the overlapped area 411 picked up by the image pickup unit 16b are different from each other. Therefore, the parking assist ECU 14 of the first embodiment corrects the luminance or the like of each of the image data picked up by each of the image pickup units 16a to 16d, and then, makes composite image by the image data picked up by the respective image pickup units 16a to 16d, and generates an overhead image data to be presented to the driver.

Figure 5:
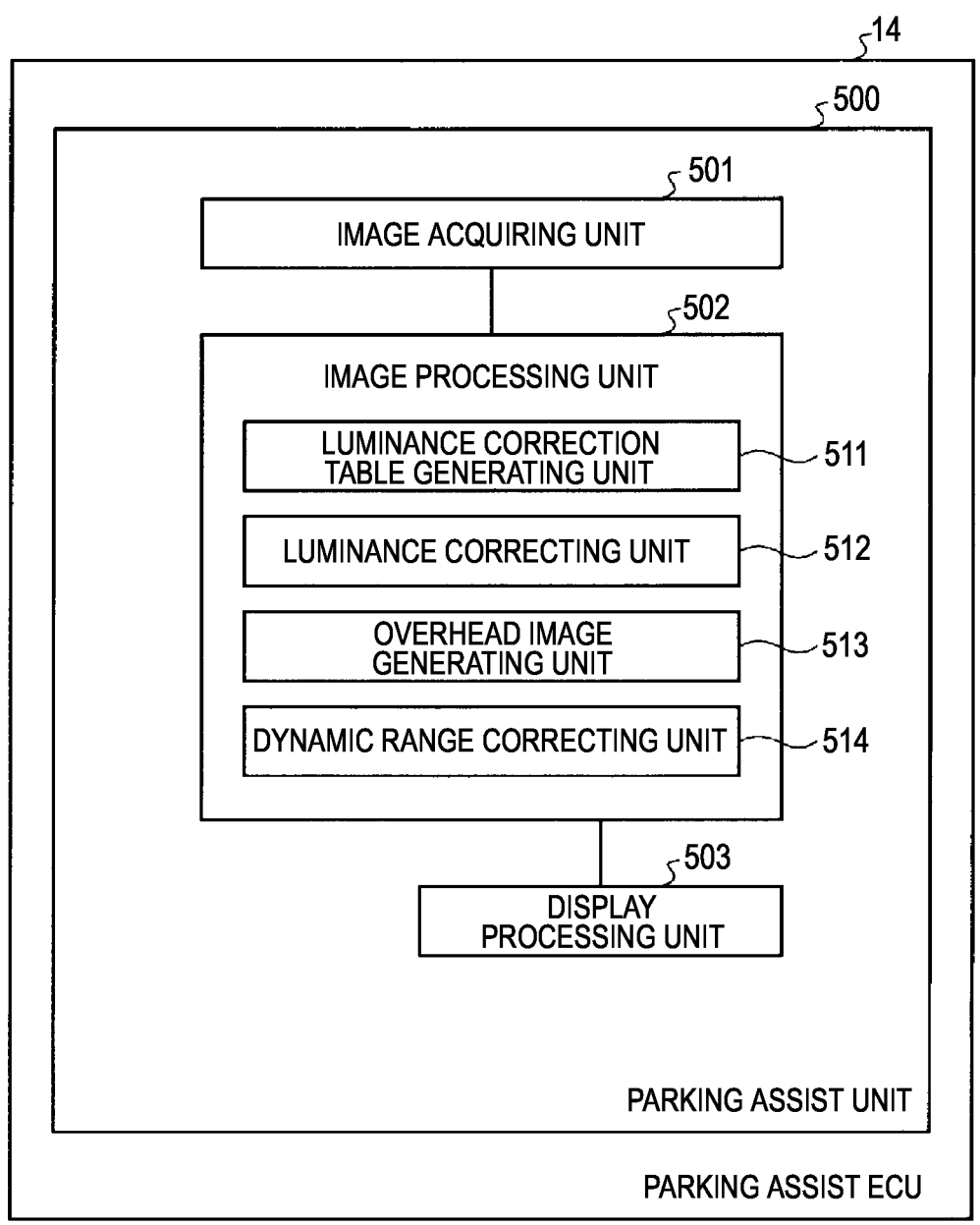
FIG. 5 is a block diagram illustrating a configuration of a parking assist unit realized in a parking assist ECU of the first embodiment.

FIG. 5 is a block diagram illustrating a configuration of a parking assist unit 500 realized in the parking assist ECU 14. The respective configurations in the parking assist unit 500 illustrated in FIG. 5 are realized by the CPU 14a configured as the parking assist ECU 14 in FIG. 3 implementing software stored in the ROM 14b.

The parking assist unit 500 executes software stored in the ROM 14b to achieve an image acquiring unit 501, an image processing unit 502, and a display processing unit 503.

Then, the parking assist unit 500 of the embodiment supports parking on the basis of the steering by the driver by displaying the situation in the periphery as an overhead image when the driver moves the vehicle 1 and parks.

The image acquiring unit 501 acquires a plurality of image data photographed by the plurality of image pickup units 16a to 16d, whose image picked-up areas are partly overlapped. A plurality of image data that the image acquiring unit 501 of the first embodiment acquires are assumed to be that of the outside environment of the vehicle 1 picked up by the plurality of image pickup units 16a to 16d provided on the vehicle 1 as described above.

The image processing unit 502 includes a luminance correction table generating unit 511, a luminance correcting unit 512, an overhead image generating unit 513, and a dynamic range correcting unit 514, and performs image processing on the image data acquired by the image acquiring unit 501.

Figure 6:
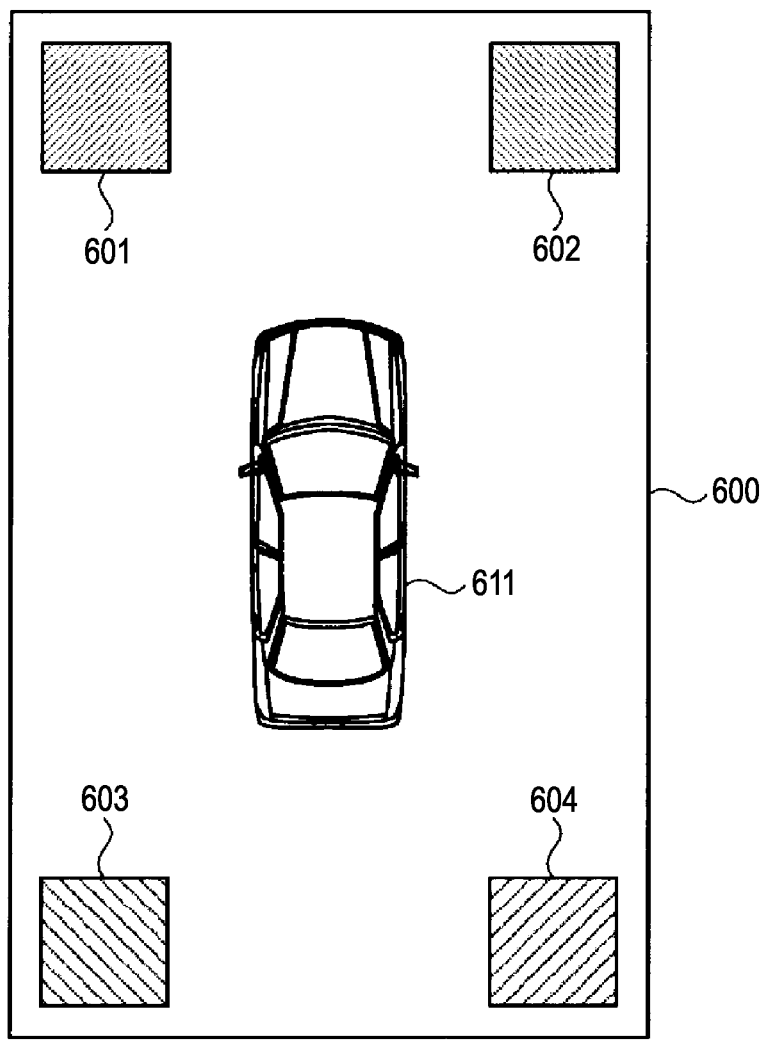
FIG. 6 is a drawing illustrating an example of an overhead image data generated by an image processing unit of the first embodiment.

FIG. 6 is a drawing illustrating an example of the overhead image data 600 generated by the image processing unit 502. The overhead image data 600 illustrated in FIG. 6 shows an icon 611 indicating the vehicle 1 and the outside environment of the vehicle 1. The overhead image data 600 is a composite image of the plurality of image data acquired by the image acquiring unit 501 made by the image processing unit 502.

The overhead image data 600 includes overlapped areas picked up by the plurality of image pickup units 16a to 16d. For example, in the first embodiment, an area 601 is assumed to be a part of the overlapped area picked up by the image pickup unit 16a and the image pickup unit 16b. In the same manner, an area 602 is assumed to be a part of the overlapped area picked up by the image pickup unit 16a and the image pickup unit 16d. An area 603 is assumed to be a part of the overlapped area picked up by the image pickup unit 16b and the image pickup unit 16c. An area 604 is assumed to be a part of the overlapped area picked up by the image pickup unit 16c and the image pickup unit 16d. When generating an overhead image data by making a composite image of the plurality of image data, luminance of the areas of the image data before making the composite image corresponding to the overlapped areas 601 to 604 needs to be equalized in advance.

Therefore, in the image processing unit 502 of the first embodiment, the luminance of the respective image data acquired by the image acquiring unit 501 is corrected before making a composite image.

Figure 7A:
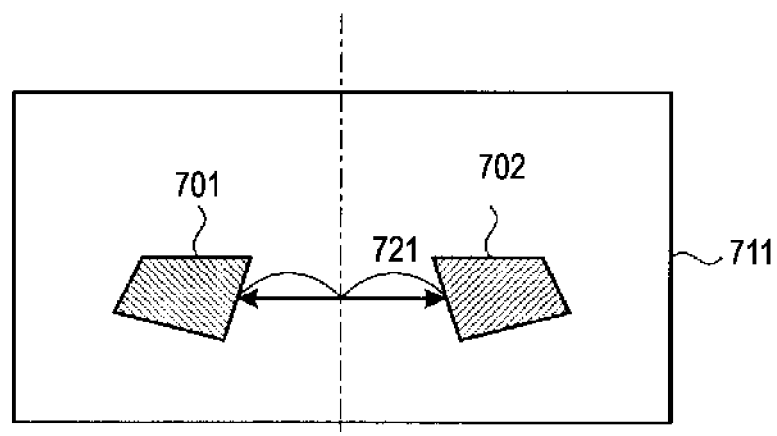
FIGS. 7A and 7B are drawings illustrating an example of overlapped areas of a plurality of image data picked up by respective image pickup units of the vehicle of the first embodiment.
Figure 7B:
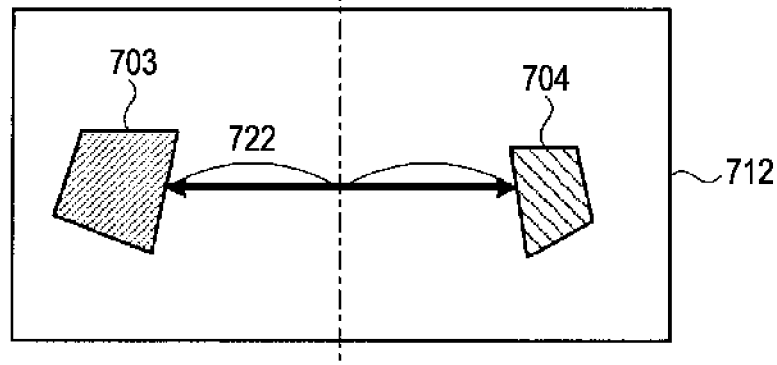

FIGS. 7A and 7B are drawing illustrating an example of overlapped areas in image data (hereinafter, also referred to as front image data) 711, which is image data of the front picked up by the image pickup unit 16a, which is a front camera of the vehicle 1, and in image data (hereinafter, also referred to as side image data) 712, which is image data of the side picked up by the image pickup unit 16b, which is a side camera of the vehicle 1.

The front image data 711 illustrated in FIG. 7A is image data of the outside environment picked up from the end 2c on the front of the vehicle 1. An area 701 included in the front image data 711 corresponds to the overlapped area 601 in FIG. 6, and an area 702 corresponds to the overlapped area 602 in FIG. 6.

The side image data 712 illustrated in FIG. 7B is image data of the outside environment picked up from the end 2d on the left of the vehicle 1. Then, an area 703 included in the side image data 712 corresponds to the overlapped area 601 in FIG. 6, and an area 704 corresponds to the overlapped area 603 in FIG. 6.

In order to generate the overhead image data, making a composite image of the front image data 711 and the side image data 712 is required. However, the luminance of the area 701 of the front image data 711 and the area 703 of the side image data 712 may be different although the same area in the outside environment is indicated. The image processing unit 502 is required to correct at least one of the front image data and the side image data so that the luminances of the area 701 and the area 703 are substantially equalized.

In the first embodiment, all of the lenses used in the image pickup units 16a to 16d for picking up images are assumed to be the same, and have the same characteristic. When the lens characteristics used in the image pickup units 16a to 16d are figured out, the luminance may be corrected in accordance with the characteristics of the lenses. However, the lens characteristics may not be disclosed by camera manufactures. In such a case, it is difficult to perform adequate correction in accordance with the lens characteristics, and may display a video giving a strong feeling of strangeness as in a case, for example, where the image is brighter than the reality due to the correction of the luminance.

As a more specific example, there is a case where the visibility of the image is deteriorated by blocked up shadows or flared highlights in other areas where image were originally viewed when the luminance is interpolated on the basis of average luminance of the plurality of image data in a case where an obstacle is present in an image picked-up area from any of the image pickup units or in a case where an extreme luminance difference is generated between the image data picked up by the plurality of image pickup units.

In general, the lens has a tendency to have a light amount large at a center portion and reduced as it goes to the periphery. In other words, the difference in luminance between the area 701 of the front image data 711 and the area 703 of the side image data 712 may be caused by the difference in the light amount depending on the difference in position of the lens. The lens is considered to have a characteristic that the precision increases as it approaches the center thereof.

Therefore, in the first embodiment, when performing the correction to equalize the luminance among the plurality of image data, the correction of image data is performed on the basis of the luminance of the image data whose overlapped area is closer to the center of the lens (in other words, the center of the display area of the image data) among the plurality of image data.

In the example illustrated in FIGS. 7A and 7B, a distance 721 from the center of the front image data 711 to the area 702 is shorter than a distance 722 from the center of the side image data 712 to the distance 722. In this case, the image processing unit 502 of the first embodiment corrects the luminance of the side image data 712 so that the average luminance of the area 703 is adjusted to be substantially the same as average luminance of the area 702 of the front image data 711.

The image data acquired by picking up the image of the rear by the image pickup unit 16c, which is a rear camera of the vehicle 1 (hereinafter, also referred to as the rear image data) and the side image data have the same relationship as that between the front image data and the side image data. Therefore, the image processing unit 502 corrects the luminance of the side image data so that the average luminance of a corresponding area is adjusted to be substantially the same as average luminance of the overlapped area of the rear image data.

In this manner, the reason why performing the correction of the luminance of the image data on both sides so as to match the luminance of the front image data and the rear image data is because the overlapped area between the front image data and the rear image data is closer to the center than the overlapped area of the side image data, since the width of a general vehicle is shorter than the length in the longitudinal direction.

The image processing unit 502 of the first embodiment generates a correction table for correcting the luminance of the side image data.

Returning back to FIG. 5, the luminance correction table generating unit 511 generates a correction table for correcting the luminance of two side image data on the basis of the luminance of the front image data and the rear image data.

Figure 8:
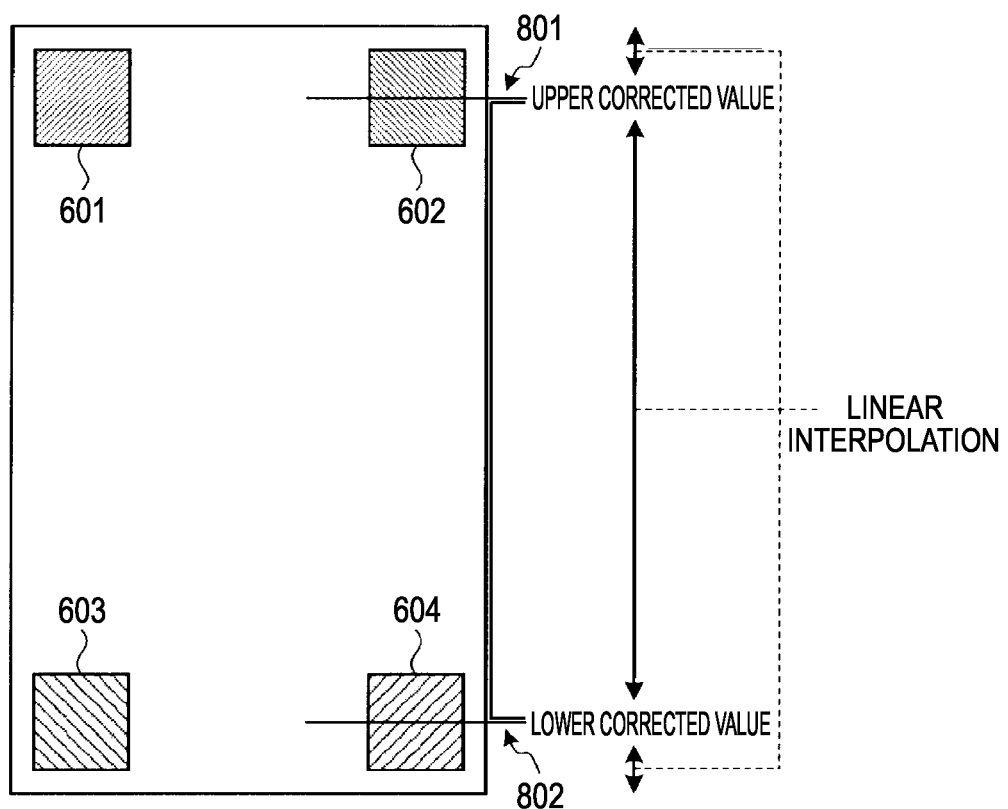
FIG. 8 is a drawing illustrating a concept of generation of a correction table of the first embodiment.

FIG. 8 is a drawing illustrating a concept of generation of the correction table. As illustrated in FIG. 8, the luminance correction table generating unit 511 generates a correction table on the basis of the overlapped areas 601 to 604 in which a plurality of image data (rear image data and side image data, or front image data and the side image data) are overlapped. First of all, the luminance correction table generating unit 511 calculates average luminance of area of the front image data corresponding to the overlapped area 601 and average luminance of an area of the front image data corresponding to the overlapped area 602. In the same manner, the luminance correction table generating unit 511 calculates average luminance of area of the rear image data corresponding to the overlapped area 603 and average luminance of an area of the rear image data corresponding to the overlapped area 604.

Furthermore, the luminance correction table generating unit 511 calculates average luminance of area of first (left) side image data corresponding to the overlapped area 601 and average luminance of an area of first (left) side image data corresponding to the overlapped area 603. Furthermore, the luminance correction table generating unit 511 calculates average luminance of area of second (right) side image data corresponding to the overlapped area 602 and average luminance of an area of second (right) side image data corresponding to the overlapped area 604.

The luminance correction table generating unit 511 calculates the difference in average luminance between image data in the overlapped areas 601 to 604. Then, the difference of the average luminance corresponds to a correction value with respect to the side image data.

The luminance correction table generating unit 511 generates a correction table configured to correct the center of the overlapped area by a difference of the calculated average luminance. For example, the luminance correction table generating unit 511 generates the correction table configured to correct the center of the overlapped area with a correction value of "−10" at a center 801 of the overlapped area 602 when the difference of the average luminance of the overlapped area 602 is "10", and with a correction value "10" at a center 802 of the overlapped area 604 when the difference of the average luminance of the overlapped area 604 is "−10". Then, the luminance correction table generating unit 511 sets a correction value obtained by primary expression for linearly interpolating respective pixels other than the centers 801 and 802 at the correction table by using respective correction values of the centers 801 and 802.

The luminance correcting unit 512 corrects the luminance of the side image data on the basis of the correction table generated by the luminance correction table generating unit 511. Accordingly, the luminance correcting unit 512 of the first embodiment is capable of correcting the side image data so as to cause the luminance of the overlapped area of the side image data to match the luminance of the overlapped area of the front image data or the rear image data because the position of the overlapped area included in the front image data or the rear image data between the two image data having the overlapped area where image picked-up areas are overlapped is close to the center of the display area in comparison with the position of the overlapped area in the side image data.

The overhead image generating unit 513 generates an overhead image data obtained when looking down at the environment of the outside of the periphery of the vehicle 1 from above on the basis of a plurality of image data after having been corrected by the luminance correcting unit 512 and conversion information recorded in a mapping table (not illustrated).

The dynamic range correcting unit 514 performs a dynamic range correction with respect to the overhead image data.

The display processing unit 503 displays overhead image data after having been corrected by the dynamic range correcting unit 514 on the display device 8.

Figure 9:
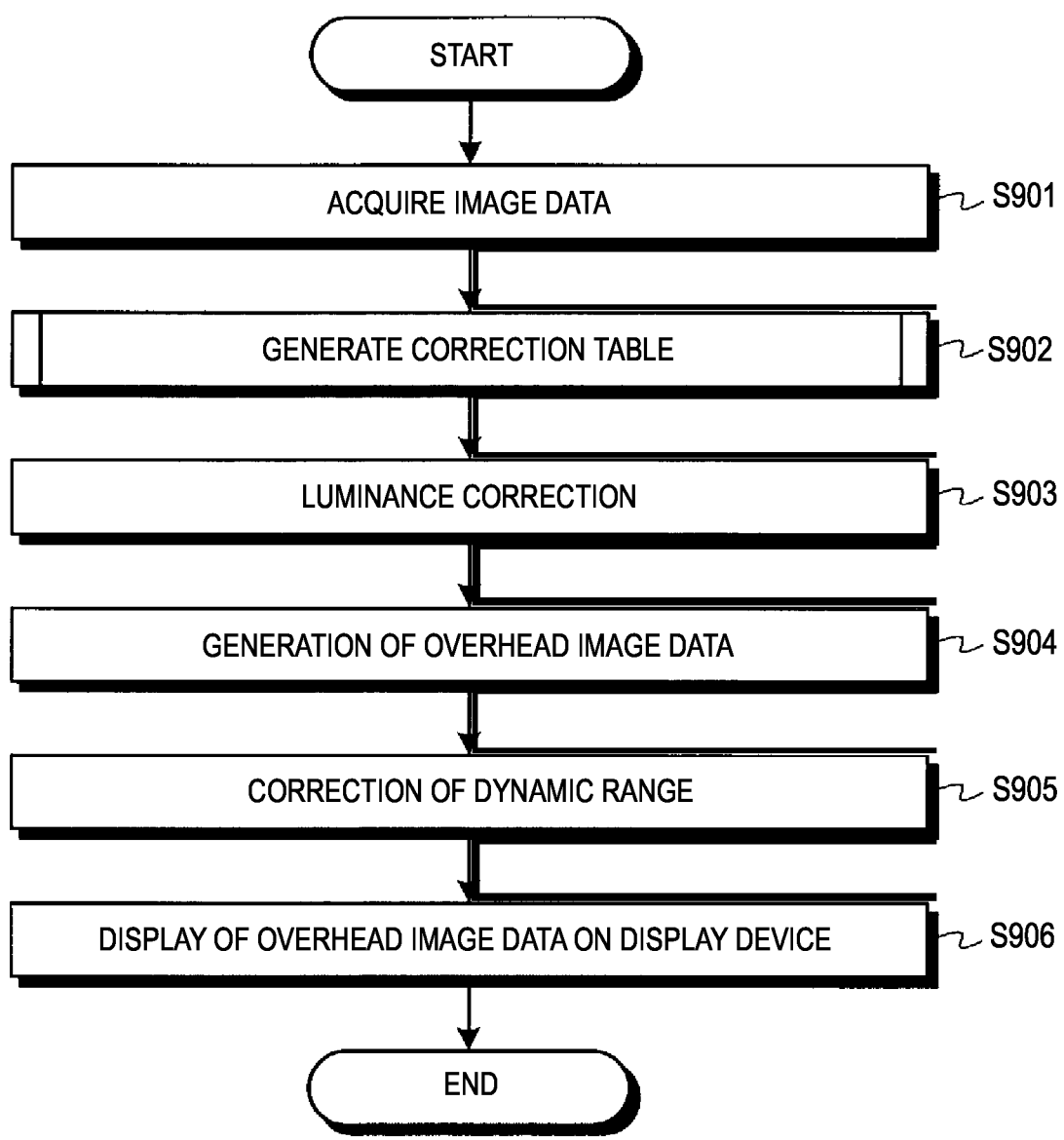
FIG. 9 is a flowchart illustrating a procedure of processing until being displayed on a display device of a parking assist unit of the first embodiment.

Subsequently, the process until being displayed on the display device 8 in the parking assist unit 500 according to the first embodiment will be described. FIG. 9 is a flowchart illustrating a procedure of the process described above in the parking assist unit 500 of the first embodiment.

First of all, the image acquiring unit 501 acquires a plurality of image data picked up by the image pickup units 16a to 16d (Step S901).

Subsequently, the luminance correction table generating unit 511 generates a correction table configured to correct the side image data on the basis of the acquired plurality of image data (Step S902).

Then, the luminance correcting unit 512 uses the generated correction table to correct two side image data (Step S903).

Subsequently, the overhead image generating unit 513 generates overhead image data on the basis of a plurality of image data including the side image data after having been subjected to a correction of the luminance (Step S904).

Subsequently, the dynamic range correcting unit 514 performs a dynamic range correction with respect to the overhead image data (Step S905).

The display processing unit 503 displays overhead image data after having been subjected to a correction of dynamic range on the display device 8 (Step S906).

With the above-described process procedure, the parking assist unit 500 of the first embodiment achieves display of the overhead image data suitably corrected in the luminance.

Figure 10:
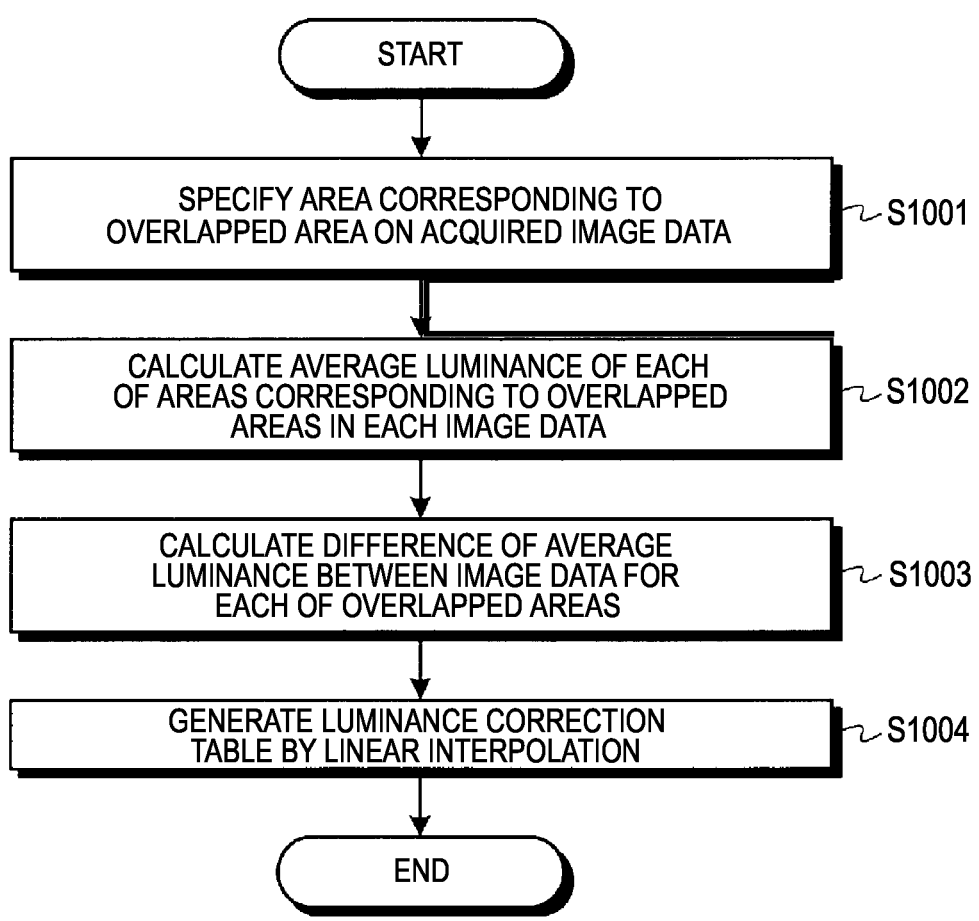
FIG. 10 is a flowchart illustrating a procedure of a process of generating a correction table of the parking assist unit of the first embodiment.

Subsequently, a process of generation of the correction table in Step S902 illustrated in FIG. 9 in the parking assist unit 500 according to the first embodiment will be described. FIG. 10 is a flowchart illustrating a procedure of the process described above in the parking assist unit 500 of the first embodiment.

First of all, the luminance correction table generating unit 511 specifies an area corresponding to the overlapped area of the overhead image data for each of the plurality of image data acquired by the image acquiring unit 501 (Step S1001).

Subsequently, the luminance correction table generating unit 511 calculates the average luminance for each of the areas corresponding to the overlapped areas for each of the image data (Step S1002).

Then, the luminance correction table generating unit 511 calculates the difference in the luminance between the image data for each of the overlapped areas (Step S1003).

Subsequently, the luminance correction table generating unit 511 generates a correction table after having subjected to an linear interpolation using the calculated differences as correction values of the center position of the overlapped areas in the correction table (Step S1004).

The correction of the side image data is performed by using the correction table generated by the above-described process procedure.

In the first embodiment, an example in which the linear interpolation is performed when interpolating the correction value of an area other than the overlapped area has been described. However, the embodiment is not limited to the linear interpolation, and other various interpolating methods such as an interpolation using a spline curve may be employed.

The vehicle 1 of the first embodiment is configured to perform the correction of the luminance on the basis of the positions of the overlapped areas for the image data photographed by the four image pickup units 16a to 16d mounted on the front, rear, left and right of the vehicle 1, as described above. Accordingly, the luminance difference between the end portion and the center portion of the lens is suppressed. Furthermore, the overhead image data suitably corrected in the luminance is presented to the driver.

At this time, the image processing unit 502 of the parking assist unit 500 performs the correction so as to achieve substantially the same average luminance in the overlapped areas of the image data photographed by the image pickup units 16a to 16d adjacent to each other. However, the first embodiment is not limited to the correction so as to achieve substantially the same average luminance.

Second Embodiment

In the first embodiment, an example of generating the overhead image data by making the composite image of the image data picked up by the image pickup units 16 has been described. However, the first embodiment is not limited to generation of the overhead image data by making a composite data from the picked up image data, and the picked up image data may be presented to the driver as an image looked down after having been segmented respectively.

Figure 11:
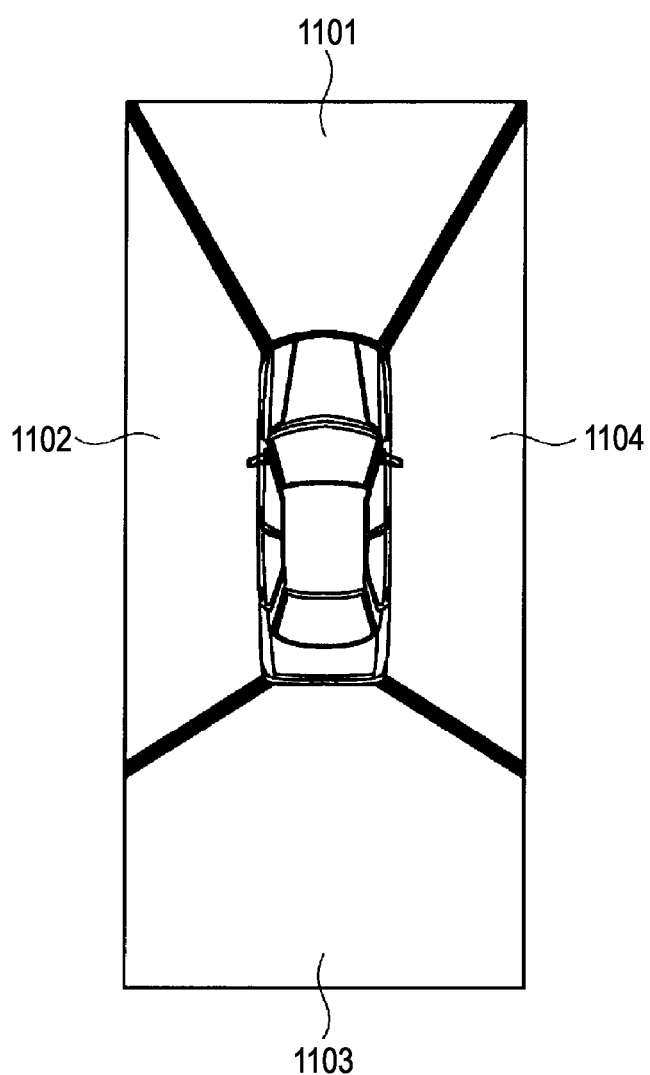
FIG. 11 is a drawing illustrating an example of an overhead video to be displayed on the display device by a parking assist unit of a second embodiment.

FIG. 11 is a drawing illustrating an example of the overhead video to be displayed on the display device 8 by the parking assist unit 500 of a second embodiment. In the example illustrated in FIG. 11, the outside environment of the vehicle 1 is displayed by being segmented into four areas 1101 to 1104 in accordance with the difference of the image pickup units 16a to 16d.

In a case where such display is performed as well, since the image picked-up areas of the image pickup units 16a to 16d are partially overlapped as illustrated in FIG. 4, the correction table is generated in the same manner as the first embodiment, whereby correction of the luminance of the side image data is achieved. By bringing the luminance among the image data closer, a video which does not give a feeling of strangeness may be presented to the driver.

Furthermore, since the display is done by segmenting the image into each of the image data, the luminance of the areas corresponding to the overlapped areas of the side image data needs not to be corrected so as to be substantially equal to the luminance of the areas corresponding to the overlapped areas of the front image data or the rear image data as in the first embodiment. Accordingly, the luminance correcting unit 512 of the parking assist unit 500 of the second embodiment make corrections in such a manner that the average luminance after the correction of the areas of the side image data corresponding to the overlapped areas comes between the average luminance of the area of the front image data (or the rear image data) and the luminance before the correction.

Specifically, the luminance correction table generating unit 511 calculates the correction value in the same process as in the first embodiment, and then multiplies the calculated correction value by a coefficient of 0.5. In the second embodiment, a case of the multiplication by a coefficient of 0.5 is exemplified. However, the coefficient is not limited thereto, and may be any value between 0.1 and 0.9. After the multiplication by the coefficient, a process until the display of the overhead video is performed in the same process as the first embodiment.

In the second embodiment, by matching the luminance to some extent (a coefficient of 0.5), the feeling of strangeness caused by the difference between the image data is reduced and flared highlights or blocked up shadows in other areas caused by the correction of the luminance until becoming substantially equal is suppressed, thereby suppressing lowering of visibility.

Figure 12:
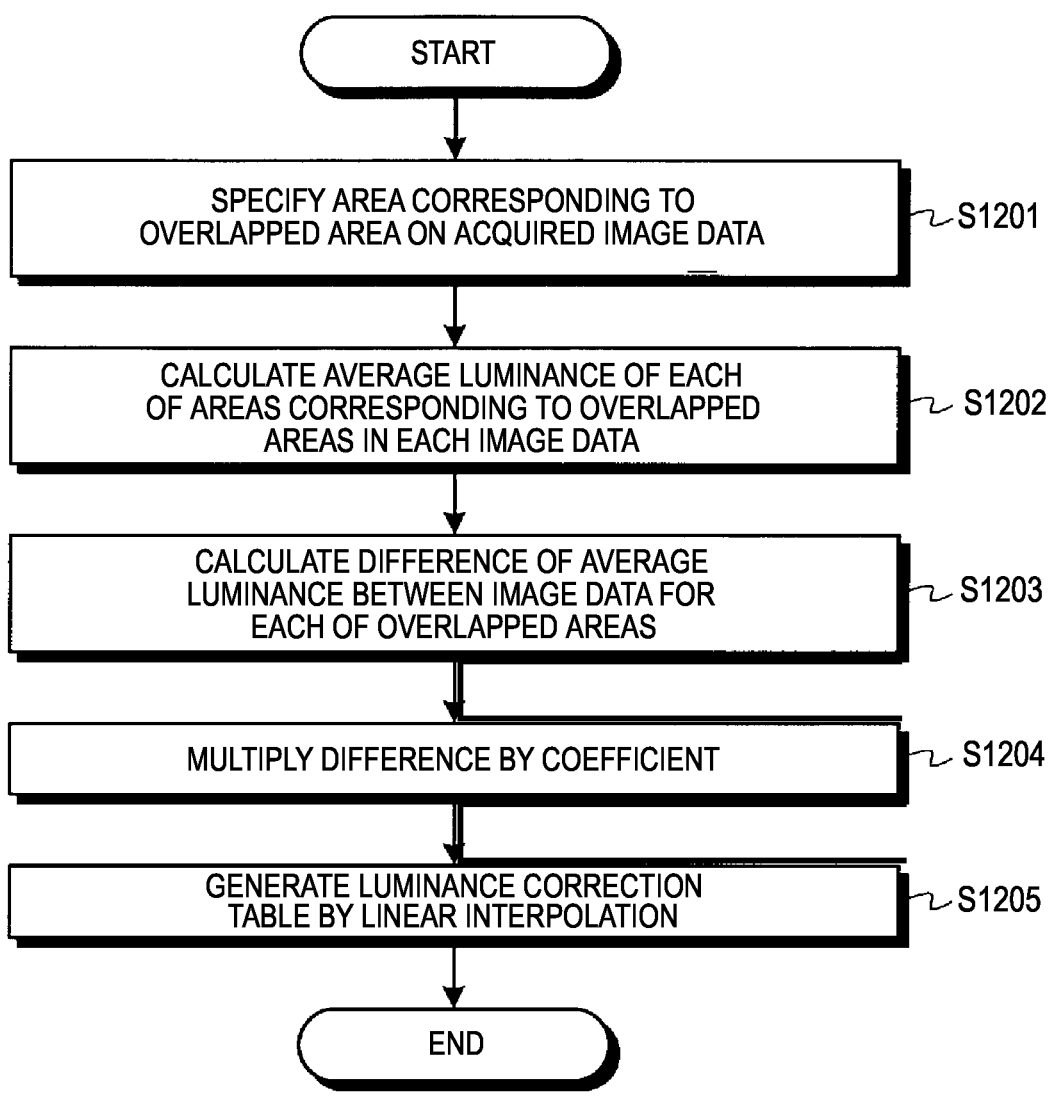
FIG. 12 is a flowchart illustrating a procedure of a process of generating a correction table of the parking assist unit of the second embodiment.

Subsequently, a process of generation of the correction table in Step S902 illustrated in FIG. 9 described in the first embodiment in the parking assist unit 500 according to the second embodiment will be described. FIG. 12 is a flowchart illustrating a procedure of the process described above in the parking assist unit 500 of the second embodiment. Description of other processes, being the same as those in the first embodiment, is omitted.

First of all, the same processes as in step S1001 to S1003 are performed to calculate the differences in the luminance between the image data for each of the overlapped areas (Step S1201 to S1203).

Subsequently, the luminance correction table generating unit 511 multiplies the calculated differences in the luminance of the respective overlapped areas by a coefficient of 0.5 (Step S1204).

Subsequently, the luminance correction table generating unit 511 generates a correction table after having subjected to an linear interpolation using the calculated differences by the coefficient as correction values of the center position of the overlapped areas in the correction table (Step S1205).

In the second embodiment, even in a case where there is an extremely large difference in the average luminance between the image data whose image picked-up areas are overlapped with each other in the areas in question, the correction value is restricted by being multiplied by the coefficient. By suppressing the correction for substantial equalization as in the first embodiment, lowering of visibility of interpolated portions other than the areas in question may be suppressed to some extent. In the second embodiment, the boundaries between the image data picked up by the image pickup units 16a to 16d are displayed, so that the driver recognizes that these image data are picked up by the different image pickup units 16a to 16d. In addition, by segmenting the image with the boundaries, the driver recognizes the differences among the image pickup units 16a to 16d, and therefore the feeling of strangeness due to the difference in the luminance may be suppressed to some extent without correcting the luminance to a level substantially equal.

In the embodiments described above, on the basis of the luminance of the image data among the plurality of image data picked up by the image pickup units 16a to 16d, whose overlapped area where the image picked-up areas are overlapped is close to the center of the lens, the luminance of other image data is corrected. Accordingly, suitable correction of the luminance is achieved for the plurality of image data even though the lens characteristics of the image pickup units 16a to 16d are not figured out.

The embodiments of this disclosure have been described. However, these embodiments are illustrative only, and limiting the scope of this disclosure is not intended. These new embodiments may be implemented in other various modes, and various omissions, replacements, and modifications may be made without departing the scope of the present invention. These embodiments and modifications thereof are included in the scope of the invention, and are included in the invention described in the appended claims and a range equivalent thereto.

A vehicle control apparatus of an embodiment includes an acquiring unit and a correcting unit as an example. The acquiring unit is configured to acquire information of a plurality of images photographed by a plurality of image pickup units provided on a vehicle as an outside environment of the vehicle and whose image picked-up areas are partly overlapped. The correcting unit compares a position of a first overlapped area included in one of two items of image information of images whose image picked-up areas are overlapped with each other with a position of a second overlapped area of the other image information, and if the position of the first overlapped area is closer to a center of a display area of the image information, corrects the other image information so as to cause the luminance of the second overlapped area to match the luminance of the first overlapped area. Therefore, a suitable correction is advantageously achieved for image information irrespective of the lens characteristics of the plurality of image pickup units.

As an example of the vehicle control apparatus described above further includes a generating unit configured to generate an overhead video looking down at an outside environment of the vehicle from above on the basis of the plurality of items of image information corrected by the correcting unit. Therefore, since an overhead video is generated on the basis of the plurality of items of image information of the images corrected in the luminance, an overhead video having a good visibility is advantageously provided for the driver.

As an example of the vehicle control apparatus described above, the overhead video generated by the generating unit is segmented for each of the plurality of items of image information. Therefore, the overhead image in which the difference of the image pickup units is recognizable is advantageously provided for the driver.

As an example of the vehicle control apparatus described above, the correcting unit further corrects the luminance of the second overlapped area after the correction to have a value between the luminance of the first overlapped area and the luminance of the second overlapped area before the correction. Therefore, a feeling of strangeness due to the difference in the luminance among the plurality of items of image information is advantageously suppressed.

As an example of the vehicle control apparatus described above, in a case where a first image picked-up area of the image information of the picked up image of the outside environment of a front from a front end portion of the vehicle or of the image information of the picked up image of an outside environment of a rear portion from a rear end portion of the vehicle is partly overlapped with a second image picked up area of the image information of the image picked up sideward from the side surface portion of the vehicle, the correcting unit corrects the image information of the image picked up from the side surface portion so as to cause the luminance of the overlapped area of the second image picked-up area to match the luminance of the overlapped area of the first image picked-up area. Therefore, a suitable luminance correction of the image information in accordance with the vehicle body may be advantageously achieved in accordance with the vehicle body.

As an example of the vehicle control apparatus described above, the plurality of image pickup units provided on the vehicle have the same lens characteristics. Therefore, a suitable luminance correction is advantageously achieved irrespective of the lens characteristics of the plurality of image pickup units.

A vehicle control method of the embodiment includes an acquiring step and a correcting step. The acquiring step acquires information of a plurality of images photographed by a plurality of image pickup units provided on a vehicle as an outside environment of the vehicle and whose image picked-up areas are partly overlapped. The correcting step compares a position of a first overlapped area included in one of two items of image information of images whose image picked-up areas are overlapped with each other with a position of a second overlapped area of the other image information, and if the position of the first overlapped area is closer to a center of a display area of the image information, corrects the other image information so as to cause the luminance of the second overlapped area to match the luminance of the first overlapped area. Therefore, as an example, a suitable correction is advantageously achieved for image information irrespective of the lens characteristics of the plurality of image pickup units.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle control apparatus comprising:
   an acquirer configured to acquire a plurality of items of image information of images photographed by a plurality of image pickup units provided on a vehicle as an outside environment of the vehicle and whose image picked-up areas are partly overlapped with each other, a plurality of items including a first overlapped area included in one of two items of image information of images whose image picked-up areas are overlapped and a second overlapped area of another image information; and
   a corrector configured to correct the other image information, if a position of the first overlapped area is closer to a center of a display area of the image information, so as to cause the luminance of the second overlapped area to match the luminance of the first overlapped area,
   wherein all lenses used in the plurality of image pickup units are the same, and
   wherein angles of view of all the image pickup units are the same.

2. The vehicle control apparatus according to claim 1, further comprising:
   a generator configured to generate an overhead video looking down at an outside environment of the vehicle from above on the basis of the plurality of items of image information corrected by the corrector.

3. The vehicle control apparatus according to claim 2, wherein the overhead video generated by the generator is segmented for each of the plurality of items of image information.

4. The vehicle control apparatus according to claim 3, wherein the corrector further corrects the luminance of the second overlapped area after the correction to have a value between the luminance of the first overlapped area and the luminance of the second overlapped area before the correction.

5. The vehicle control apparatus according to claim 1, wherein in a case where a first image picked-up area of the image information of the picked up image of the outside environment of a front from a front end portion of the vehicle or of the image information of the picked up image of an outside environment of a rear portion from a rear end portion of the vehicle is partly overlapped with a second image picked up area of the image information of the image picked up sideward from the side surface portion of the vehicle, the corrector corrects the image information of the image picked up from the side surface portion so as to cause the luminance of the overlapped area of the second image picked-up area to match the luminance of the overlapped area of the first image picked-up area.

6. The vehicle control apparatus according to claim 2, wherein in a case where a first image picked-up area of the image information of the picked up image of the outside environment of a front from a front end portion of the vehicle or of the image information of the picked up image of an outside environment of a rear portion from a rear end portion of the vehicle is partly overlapped with a second image picked up area of the image information of the image picked up sideward from the side surface portion of the vehicle, the corrector corrects the image information of the image picked up from the side surface portion so as to cause the luminance of the overlapped area of the second image picked-up area to match the luminance of the overlapped area of the first image picked-up area.

7. The vehicle control apparatus according to claim 3, wherein in a case where a first image picked-up area of the image information of the picked up image of the outside environment of a front from a front end portion of the vehicle or of the image information of the picked up image of an outside environment of a rear portion from a rear end portion of the vehicle is partly overlapped with a second image picked up area of the image information of the image picked up sideward from the side surface portion of the vehicle, the corrector corrects the image information of the image picked up from the side surface portion so as to cause the luminance of the overlapped area of the second image picked-up area to match the luminance of the overlapped area of the first image picked-up area.

8. The vehicle control apparatus according to claim 4, wherein in a case where a first image picked-up area of the image information of the picked up image of the outside environment of a front from a front end portion of the vehicle or of the image information of the picked up image of an outside environment of a rear portion from a rear end portion of the vehicle is partly overlapped with a second image picked up area of the image information of the image picked up sideward from the side surface portion of the vehicle, the corrector corrects the image information of the image picked up from the side surface portion so as to cause the luminance of the overlapped area of the second image picked-up area to match the luminance of the overlapped area of the first image picked-up area.

9. The vehicle control apparatus according to claim 1, wherein when a difference between the luminance of the first overlapped area and the luminance of the second overlapped area exceeds a predetermined value, the corrector is configured so that a correcting value is restricted by being multiplied by a coefficient.

10. The vehicle control apparatus according to claim 1, wherein one of image information is a front image data or a rear image data, and the other image information is a side image data, and the corrector corrects the side image data so as to cause the luminance of the side image data to match the luminance of the front image data or the rear image data.

11. The vehicle control apparatus according to claim 1, wherein the corrector is configured to correct the other image information so as to cause the luminance of the second overlapped area to match the luminance of the first overlapped area based on the difference of average luminance between the first overlapped area and the second overlapped area.

12. A vehicle control method comprising:
   acquiring information of a plurality of images photographed by a plurality of image pickup units provided on a vehicle as an outside environment of the vehicle and whose image picked-up areas are partly overlapped, wherein the two items of image information, a plurality of items including a first overlapped area included in one of two items of image information of images whose image picked-up areas are overlapped and a second overlapped area of another image information; and
   correcting the other image information, if a position of the first overlapped area is closer to a center of a display area of the image information, so as to cause the luminance of the second overlapped area to match the luminance of the first overlapped area,
   wherein all lenses used in the plurality of image pickup units are the same, and
   wherein angles of view of all the image pickup units are the same.

13. The vehicle control method according to claim 12, wherein when a difference between the luminance of the first overlapped area and the luminance of the second overlapped area exceeds a predetermined value, a correcting value is restricted by being multiplied by a coefficient.

* * * * *